3,414,647
SHAPED ARTICLES OF CRYSTALLINE POLY (PARA - TERT. - BUTYLSTYRENE)POLYMER AND METHOD OF MAKING THE SAME
Frank L. Saunders and Everett H. Richardson, Midland, Mich., assignors to The Dow Chemical Company, Midland, Mich., a corporation of Delaware
Filed June 22, 1964, Ser. No. 387,254
6 Claims. (Cl. 264—235)

ABSTRACT OF THE DISCLOSURE

A method for making shaped articles of crystalline linear poly(para-tert.-butylstyrene) which method comprises forming a heat-plastified non-crystalline homopolymer of para-tert.-butylstyrene, rich in the isotactic structure, at temperatures between 140° and 180° C., into a desired shape and thereafter heating said shaped polymer at temperatures between 190° and 280° C. to effect rapid crystallization of the shaped polymer.

---

Figure 1:
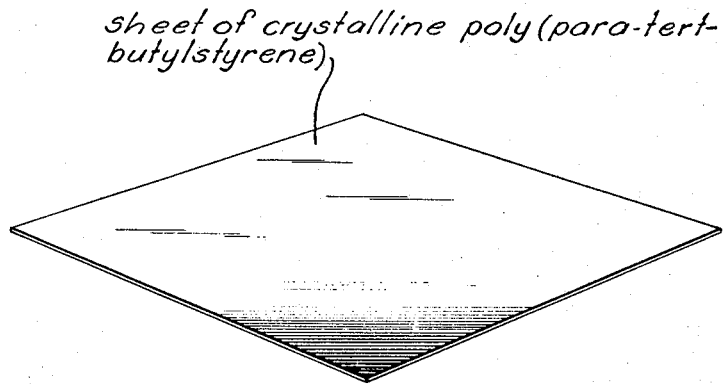

This invention concerns shaped articles of crystalline poly(para-tert.-butylstyrene)polymer and a method of making the same. It relates more particularly to a method for making shaped articles of poly(para-tert.-butylstyrene) and thereafter effecting crystallization of the polymer.

It is known to prepare shaped articles of crystalline polystyrene by extracting a body of polymeric material consisting of non-crystallizable atactic polymers, block polymers and crystallizable isotactic polymers with a ketone solvent to selectively dissolve out the non-crystallizable atactic polymers and the block polymers, and molding of the crystallizable residue above its melting point to obtain a preform and thereafter annealing the preformed polymer at a temperature below its melting point to effect crystallization of the isotactic polystyrene.

Natta et al. in Die Makromolekulare Chemie vol. XXVIII, pages 253–261 (1958) prepare high polymers having a linear and ordered structure from vinyl aromatic compounds using stereo-specific catalytic systems such as TiCl₄ and aluminum triethyl, and teach that depending upon the structure of the monomer, these polymers are in some cases crystallizable to a high or medium degree of crystallinity while in other cases they are not crystallizable (at least by conventional annealing), and that polymers of para-substituted styrenes are not crystallizable at all when the size of the substituent is not very small.

Our researches have shown that homopolymers of para-tert.-butylstyrene, prepared by using stereo-specific catalytic systems, are morphous or non-crystalline polymeric products as originally prepared, and that such polymer exhibits little, if any tendency to become crystalline upon standing at room temperature and atmospheric pressure. However, it has now been discovered that the apparently amorphous or non-crystalline para-tert.-butylstyrene polymer prepared using stereo-specific catalytic systems, is in reality rich in the isotactic structure, and the polymer can readily be converted to a crystalline form, and particularly to a shaped article of the crystalline polymer, by forming or shaping the apparently non-crystalline para-tert.-butylstyrene polymer rich in the isotactic structure, at heat-plastifying temperatures between about 140° C. and 180° C., or at temperatures between about 300° C. and the decomposition temperature of the polymer, to produce a shaped article, and thereafter heating or annealing the shaped article at temperatures within the range of from about 190° C. to 280° C., preferably from 200° to 270° C. to effect crystallization of the shaped polymer article.

In other words the apparently amorphous or non-crystalline para-tert.-butylstyrene polymer rich in the isotactic structure, as initially prepared using a stereo-specific catalytic system, can readily be heat-softened or heat-plastified, i.e. rendered plastic or flowable, by heating it at temperatures between about 140° and 180° C., preferably from 160° C. to 180° C., which temperature is below that required to effect rapid crystallization of the polymer to any appreciable degree in a relatively short period of time, and is then formed or shaped into an article by usual injection or compression molding operations or by extrusion methods, after which the shaped article is heated or maintained at temperatures within the range of from about 190° to 280° C., preferably from 200° to 270° C. to rapidly effect the crystallization of the shaped polymer. In an alternative procedure, the polymer can be rendered plastic and flowable or moldable under pressure at temperatures between about 140° and 180° C., where it is substantially non-crystalline, then shaped or formed at temperatures within the range of from 190° to 280° C. to simultaneously effect both shaping and crystallization of the polymer.

The amorphous or non-crystalline, or the crystalline para-tert.-butylstyrene polymer can be heated at temperatures above its crystalline melting point and shaped to form a desired article, then cooled to temperatures between 190° and 280° C. to effect crystallization of the shaped polymer, but such procedure is less satisfactory because the polymer tends to undergo decomposition or deteriorate at the elevated temperatures above the crystalline melting point.

In a preferred embodiment of the invention the amorphous or non-crystalline para-tert.-butylstyrene polymer is heated at temperatures between about 140° and 180° C., e.g. in a plastics extruder or in an injection molding machine, then is pressed or extruded into a mold maintained at temperatures within the range of from about 190° to 280° C. wherein it is simultaneously pressed, shaped and rapidly converted to the crystalline form, and after cooling, is removed as a crystalline para-tert.-butylstyrene article having a pre-determined shape, or the polymer can be extruded in the form of filaments or sheets which can be oriented, e.g. by stretching in one or more directions, while being converted to the crystalline state.

The para-tert.-butylstyrene polymer to be employed in the process for preparing the shaped crystalline poly-(para-tert.-butylstyrene) articles can be prepared in usual ways such as by procedure similar to that described in the aforementioned publication by Natta et al. employing known stereo-specific catalytic systems such as TiCl₄ and aluminum alkyls or organo-metallic compounds, e.g. aluminum triethyl.

Figure 2:
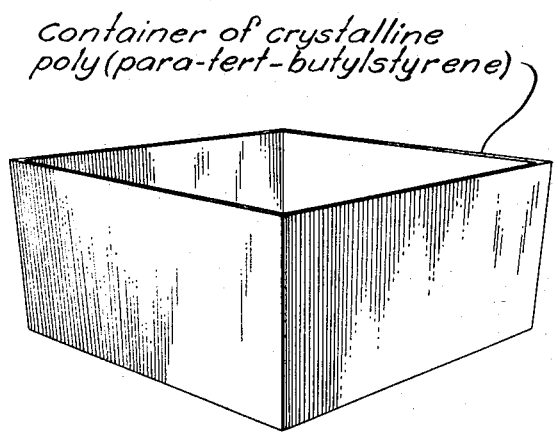
Figure 3:
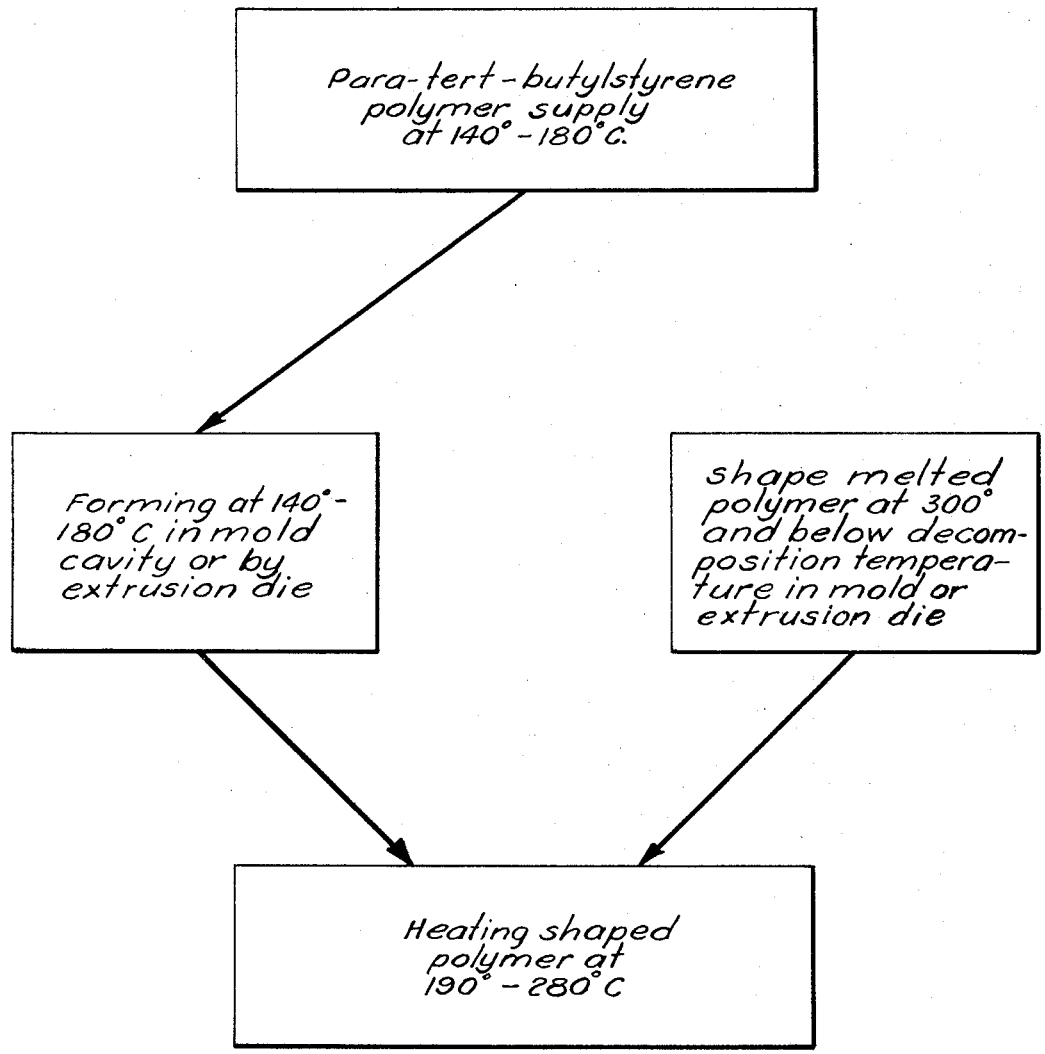

The crystalline poly(para-tert.-butylstyrene) polymer and articles prepared therefrom are useful for a variety of purposes in the home and industry. For example crystalline sheets or plates of the polymer are useful as transparent windows where a high degree of resistance to distortion by heat is desired. Molded articles such as cups or boxes are useful as containers having a high resistance to distortion by heat or hot water. The accompanying drawing is illustrative of a shaped crystalline sheet FIG. 1 and a container FIG. 2 made of the poly-(para-tert.-butylstyrene) rich in the isotactic structure, and converted to the crystalline form in accordance with the method of the invention illustrated by a diagrammatic flow sheet in FIG. 3.

The following examples illustrate ways in which the principle of the invention has been applied, but are not to be construed as limiting its scope.

EXAMPLE 1

Into a clean dry 500 ml. glass reaction vessel there was placed a charge of 0.41 ml. of $TiCl_4$ and 1.55 ml. of $Al(C_2H_5)_3$ to which was added 100 ml. of dry n-heptane and 50 ml. of para-tert-butylstyrene. The resulting mixture was maintained at temperatures between 85° and 90° C. without stirring for a period of 6 hours. A charge of 48 ml. of isopropyl alcohol containing 2 ml. of concentrated aqueous HCl solution was added with stirring. The resulting mixture was poured into methyl alcohol and the polymer precipitated. It was separated and was washed and dried in a vacuum oven at 40° C. for a period of 16 hours. There was obtained 28.4 grams of para-tert.-butylstyrene polymer. It was examined by X-ray diffraction technique and was found to be an amorphous non-crystalline polymer.

EXAMPLE 2

In each of a series of experiments, a charge of about one gram of the amorphous para-tert.-butylstyrene polymer prepared in Example 1 was placed between sheets of aluminum foil and compression molded under a ram pressure of 10,000 pounds per square inch to form a flat molding approximately 9 mils thick. The ram pressure was maintained for a time of 4 minutes and at a temperature for the molding as stated in the following table. After heating of the molded polymer in the mold for 4 minutes under pressure and at the stated temperature, the molding was cooled and removed from the press and was examined by means of X-rays to determine its crystallinity or the existence of a crystallinity pattern. Table I identifies the experiments and gives the crystallinity of the molded and heated polymer expressed as the per cent of crystallinity in the molded and annealed article.

TABLE I

| Run No. | Temp., ° C. | Crystallinity, percent |
| --- | --- | --- |
| 1 | 175 | 0 |
| 2 | 200 | 14 |
| 3 | 225 | 18.5 |
| 4 | 250 | 18.6 |
| 5 | 275 | 9.8 |
| 6 | 300 | 0 |

After storing of the molded test pieces of the poly(para-tert.-butylstyrene) for a period of 10 months at room temperature and atmospheric pressure, the moldings were re-examined to determine the crystallinity or the existence of a crystallinity pattern. The results were as follows:

TABLE II

| Run No. | Temp., ° C. | Crystallinity, percent |
| --- | --- | --- |
| 1a | 175 | 0 |
| 4a | 250 | 14.4 |
| 6a | 300 | 0 |

The drawing illustrates a molded sheet and a container made of crystalline poly(para-tert.-butylstyrene) in accordance with the invention, and the method of the invention.

EXAMPLE 3

A charge of 665 ml. of para-tert.-butylstyrene was added to a 3-liter glass reaction vessel containing 1335 ml. of normal hexane under an atmosphere of dry nitrogen gas. To the solution there was added 3.17 grams of a catalyst slurry consisting of 79 percent $TiCl_3$ and 21 percent $AlCl_3$, 4.05 grams of aluminum triisobutyl and 25 ml. of normal hexane. The resulting mixture was heated at 90° C. and stirred for 30 minutes, to polymerize the para-tert.-butylstyrene. Thereafter, the mixture was cooled to 30° C. and was mixed with 300 ml. of methyl alcohol. The polymer precipitated. It was separated by filtering, was washed with methyl alcohol and was dried in a vacuum oven, at a temperature of 40° C. for a period of 16 hours. There was obtained 129 grams of poly(para-tert.-butylstyrene) as a white powder. It was amorphous by X-ray diffraction analysis. A portion of the product was compression molded at 185° C. for 5 minutes. There was obtained a clear sheet free from crystallinity as determined by X-ray diffraction analysis. The molded sheet was heated at a temperature of 250° C. for a period of 20 minutes. It became opaque and was found to be 30 percent crystalline as determined by X-ray diffraction methods. The amorphous polymer had a Vicat softening point of 135° C. The crystalline polymer had a Vicat softening point of 215° C.

A portion of the amorphous poly(para-tert.-butylstyrene) prepared in Example 3 was extracted in a Soxhlet tube with boiling acetone for a period of 24 hours. Thirteen percent by weight of the polymer was extracted.

When a portion of the annealed crystalline polymer was extracted with acetone, only 5 percent of the polymer was removed.

EXAMPLE 5

A portion of the amorphous poly(para-tert.-butylstyrene) prepared in Example 3 was compression molded by heating at 250° C. for a period of 5 minutes to form a sheet. The molded sheet had a crystallinity of 25 percent.

We claim:

1. A method for making shaped articles of crystalline linear poly(para - tert. - butylstyrene) which comprises forming a heat-plastified non-crystalline homopolymer of para-tert.-butylstyrene rich in the isotactic structure at temperatures between 140° and 180° C. into a desired shape and thereafter heating the shaped polymer at temperatures between 190° and 280° C. to effect crystallization of the shaped polymer.

2. A method for making shaped articles of crystalline linear poly(para-tert.-butylstyrene) which comprises forcing a heat-plastified body of non-crystalline homopolymer of para-tert.-butylstyrene rich in the isotactic structure into a mold maintained at temperatures within the range of from 190° to 280° C. to effect crystallization of the polymer.

3. A method for making shaped articles of crystalline linear poly(para-tert.-butylstyrene) which comprises extruding heat-plastified non-crystalline homopolymer of poly(para-tert.-butylstyrene) rich in the isotactic structure at temperatures between 140° and 180° C. into the cavity of a mold maintained at temperatures between 190° C. and 280° C. in an amount sufficient to fill said cavity and maintaining said polymer under pressure in the mold cavity and at a temperature between 190° and 280° for a time sufficient to effect appreciable crystallization of the polymer and thereafter cooling the crystallized polymer and removing the shaped article from the mold cavity.

4. A method for making shaped articles of crystalline poly(para-tert.-butylstyrene) which comprises forming a heat-plastified homopolymer of para-tert.-butylstyrene rich in the isotactic structure at temperatures between its crystalline melting point and its decomposition temperature into a desired shape and thereafter maintaining the shaped polymer at temperatures between 190° and 280° C. to effect crystallization of the shaped polymer.

5. A shaped article comprising crystalline poly(para-tert.-butylstyrene) prepared by heating a shaped non-crystalline homopolymer of para-tert.-butylstyrene rich in the isotactic structure at temperatures between 190° and 280° C. for a time sufficient to effect crystallization of the shaped polymer article.

6. Crystalline poly(para-tert.-butylstyrene) prepared by heating a non-crystalline homopolymer of para-tert.-butylstyrene rich in the isotactic structure at temperatures between 190° and 280° C. for a time sufficient to effect crystallization of the polymer.

References Cited

UNITED STATES PATENTS

| 2,320,112 | 5/1943 | Wiley. | |
|---|---|---|---|
| 2,329,571 | 9/1943 | Wiley. | |
| 2,723,261 | 11/1955 | Levine et al. | 260—93.5 |
| 2,896,264 | 7/1959 | Natta et al. | 264—292 |

OTHER REFERENCES

Davies: British Plastics, vol. 32, No. 6, June 1959, pp. 283, 284 and 285.

Natta et al.: Die Makromolekulare Chemie, vol. 28 (1958), pp. 253–261.

JULIUS FROME, *Primary Examiner.*

A. H. KOECKERT, *Assistant Examiner.*